United States Patent
Berry

[15] 3,689,921
[45] Sept. 5, 1972

[54] METHOD AND APPARATUS FOR DIGITALLY DETERMINING THE SPEED OF A MOVING OBJECT

[72] Inventor: Fred M. Berry, Leawood, Kans.

[73] Assignee: Kustona Signal, Inc., Chanute, Kans.

[22] Filed: April 24, 1970

[21] Appl. No.: 31,609

[52] U.S. Cl................................343/8, 343/5 DP
[51] Int. Cl....................................G01s 9/44
[58] Field of Search..............................343/5 DP, 8

[56] References Cited

UNITED STATES PATENTS 3,438,031   4/1969   Fathauer ....................... 343/8
3,365,716   1/1968   Jorgensen ..................... 343/8

Primary Examiner—T. H. Tubbesing
Attorney—Lowe, Kokjer, Kircher, Wharton & Bowman

[57] ABSTRACT

A digital display Doppler radar unit has a crystal control time base and a means for correlating received Doppler signals, indicative of speed, with the time base. A digital counter counts the cycles of the received Doppler signal and compares the count with an amount (either 0 or more) previously stored. Circuit means are provided to validate the received Doppler signals only after a preselected number of valid comparisons are made and the speed corresponding to the valid received Doppler signals are displayed and/or a speed alarm sounded.

30 Claims, 9 Drawing Figures

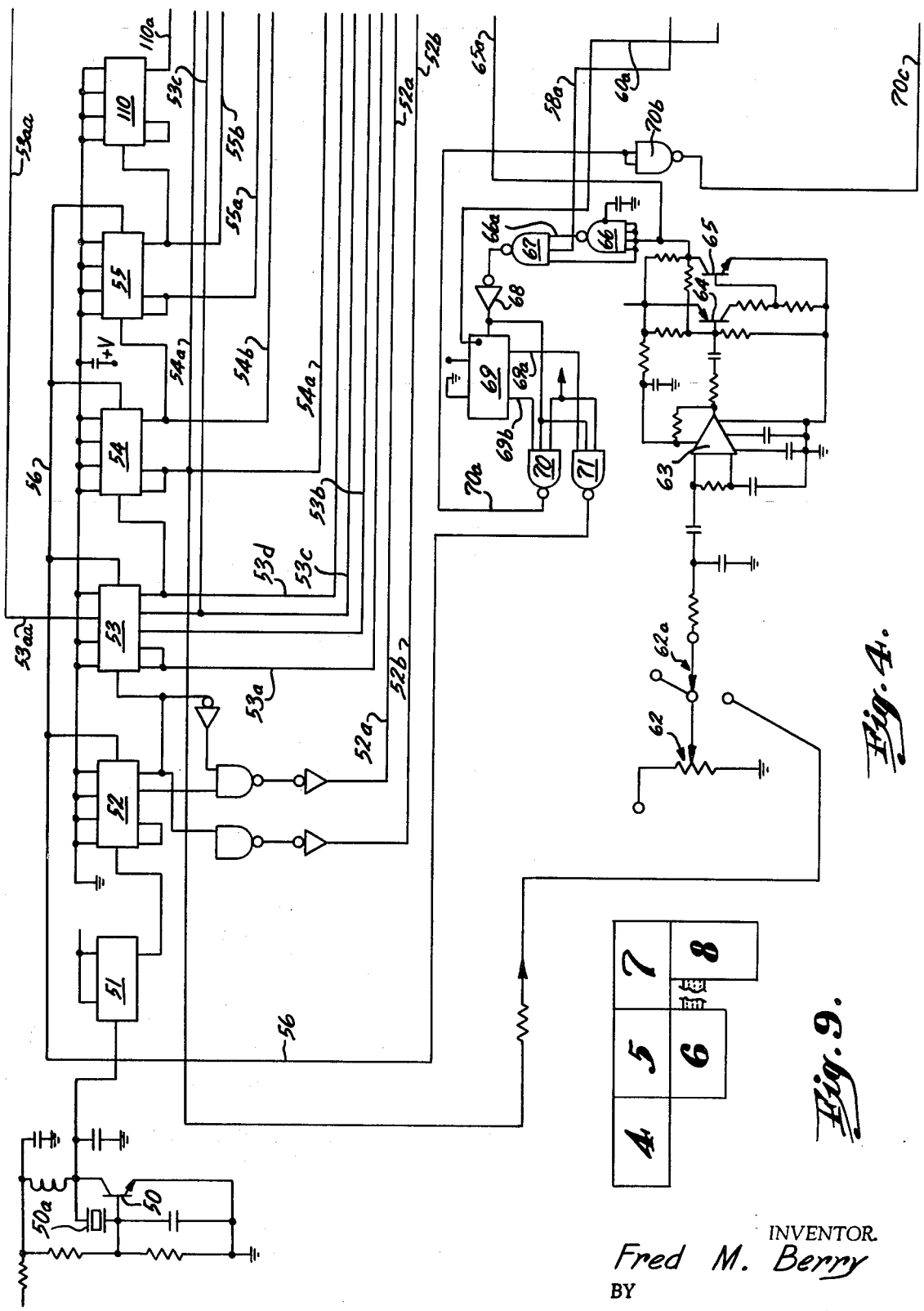

INVENTOR.
Fred M. Berry

INVENTOR.
Fred M. Berry

INVENTOR.
Fred M. Berry
BY
ATTORNEYS

METHOD AND APPARATUS FOR DIGITALLY DETERMINING THE SPEED OF A MOVING OBJECT

BACKGROUND AND BRIEF DESCRIPTION OF THE INVENTION

The use of Doppler radar techniques vehicle, measuring the speed of moving objects and more particularly for measuring the speed of vehicles is an art recognized concept. For example, a typical procedure is to utilize a directional antenna for the purpose of directing an ultra high frequency radar signal at a moving vehicle and to receive and measure a portion of the signal that is reflected back to the radar set by the moving vehicle. The motion of the vehicle due to the Doppler effect, produces a change in frequency in the reflected signal as compared with the transmitted signal. When the reflected signal is received by the radar set, it is conventionally mixed with the frequency of the transmitted radar signal thereby producing a difference frequency signal which has the frequency directly proportional to the speed of the moving vehicle. This difference frequency is generally used to position a conventional meter which is calibrated in miles per hour or other convenient units.

By their nature, Doppler return signals are often very inaccurate. This is due to the large noise level that would include white noise, reflection difficulties due to multiple targets and/or the dropping of pulses at critical intervals so that incorrect and erroneous displays are prevalent with conventional analog rate meter readouts. For example, noise bursts will generally cause a higher reading while dropouts result in a lower reading.

My invention utilizes a crystal oscillator having a precisely known frequency and a pulse shaper network to product a time base with a time interval between pulses of 1.24456 microseconds. This time base is delivered to a time increment counter which counts 25,600 counts in 31.8 milliseconds and produces output pulses with this precise time between same.

The Doppler signal (the reflected radar beam from the moving vehicle) is transmitted to a separate digital counter which counts the number of receiver pulses within a time period prescribed by the time increment counter which has been selected to allow the counts registered in the second counter to represent speed in terms of miles per hour. The total count derived from the Doppler signal is then compared with an amount previously stored (which may be 0 in the case of a first count). A digital comparator compares the amount stored verses the count in the digital counter and, along with other transfer functions results in the storing of a valid comparison in an update counter. A noncoincidence counter is also provided to indicate that the amount counted by the decimal counter does not correspond to the amount previously stored.

If a plurality of valid comparisons are indicated over a preselected number of counting cycles, the speed indicated by the totalized number of pulses is presumed valid and is accordingly digitally displayed or utilized to give either a visual or audible warning thereby indicating a speed violation. If the noncoincidence counter is activated, the count previously stored for possible display purposes is disregarded and the counting and count comparison scheme must be recycled. In this manner, all false signals including noise and reflections are disregarded and only valid violations and/or speed indications are displayed by the radar unit.

A primary object of my invention is to provide a unique method and apparatus for measuring the speed of a moving object.

An object of my invention is to provide a uniquely constructed Doppler radar unit that is extremely accurate and easy to read.

Another object of my invention is to provide a uniquely constructed digitally operated Doppler radar unit that eliminates the adverse effects of noise, inaccurate reflections, and/or dropped pulses in received Doppler signals.

A further object of my invention is to provide a unique Doppler radar unit that validates the accuracy of a received Doppler signal prior to indicating the count value of same as a correlation to vehicle speed.

A still further object of my invention is to provide a uniquely constructed Doppler radar unit which is digitally operated and which has obviated a need for analog subsystems, analog to digital converters, or various types of mechanical clamps which were heretofore needed to latch conventional meter movements generally utilized with an analog radar unit.

A further object of my invention is to provide a uniquely constructed digitally operated Doppler radar unit that selects and validates a Doppler reflected signal within 2/10 of a second and immediately displays same and/or produces a violation warning. It is a feature of the invention that a preselected number of comparisons are made in order to validate the received Doppler signals. As a result, the digital device will not read a burst of noise or other interfering reflections which have, on occasions, resulted in false and improper arrests of alleged speeders when such a device was utilized by law enforcement agencys.

Another object of my invention is to provide a unique method and apparatus for synchronizing a received signal with a precise time base.

A still further object of my invention is to provide a uniquely constructed Doppler radar unit that includes electrical circuitry for producing precise time intervals from the oscillatory output of a crystal control oscillator. Counting these time intervals and producing a time period which correlates the received Doppler signals to speed when same are received and counted within the correlated time period.

Another object of my invention is to provide a unique method for determining the speed of a vehicle comprising the steps of producing a precise time base, counting the time base in the time increment counter, receiving reflected Doppler signals and correlating said received Doppler signals with said time base, counting said correlated Doppler signals, and scaling said counted Doppler pulses so that said counted Doppler signals read out in vehicle speed.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views;

FIG. 3 is a timing plot of the pluses produced by the time increment counter;

FIGS. 4, 5, 6, 7 and 8 are to be arranged to provide a detailed schematic diagram of the circuit for digitally measuring the speed of a moving object; and FIG. 9 is a plot showing how the FIGS. 4, 5, 6, 7 and 8 are to be arranged for proper viewing.

Figure 1:
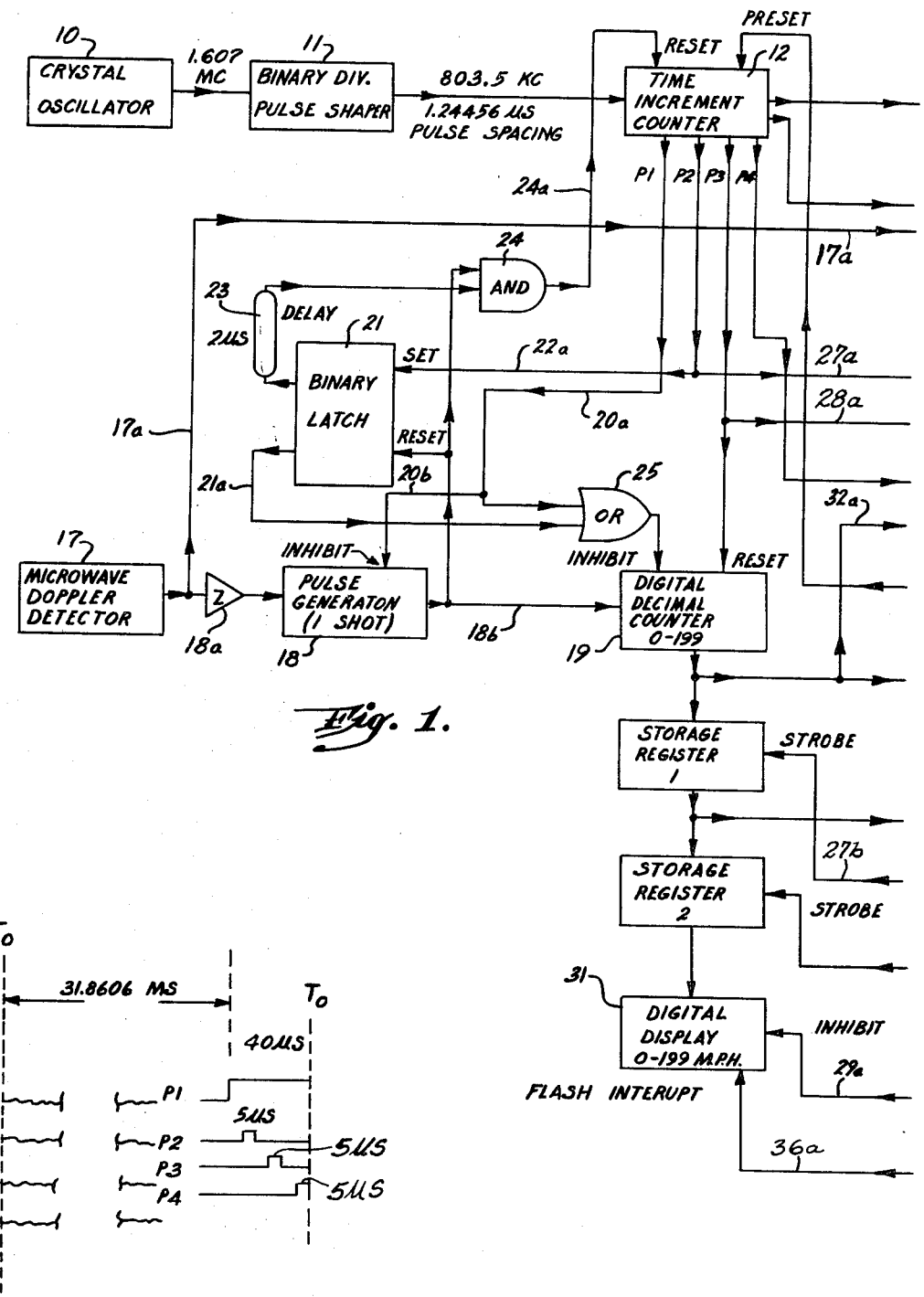
FIG. 1 is a partial block diagram of the circuit for digitally determining the speed of a moving object.
Figure 2:
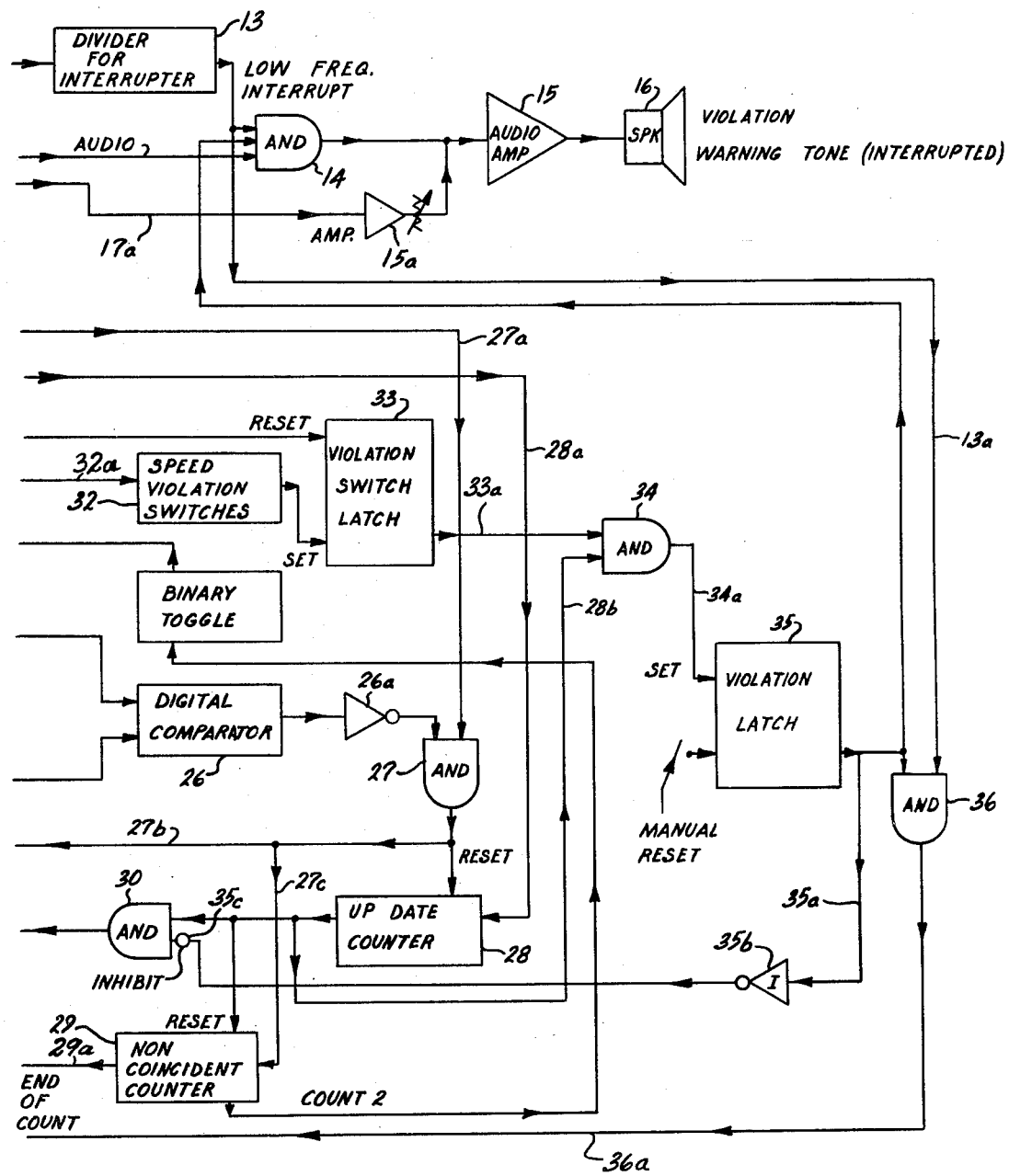
FIG. 2 is the remainder of the block diagram and interconnects with FIG. 1 by placing same on the right-hand side thereof.

Turning now more particularly to the block diagram shown in FIGS. 1 and 2, one of the primary elements of my digital radar is crystal oscillator 10 which produces a 1.607 MHZ signal output. This oscillatory output is delivered to a binary divider and pulse shaper 11 which divides the crystal oscillator signal in half thereby producing a 803.5 KHZ oscillatory output signal which is essentially a square wave having a pulse spacing of 1.24456 microseconds. This 803.5 KHZ signal is delivered to the input of time increment counter 12 which as a 25,600 count capacity.

By the judicious selection of count capacity of time increment counter 12 and the combination crystal control frequency including the pulse spacing of the pulses that are delivered to the increment counter, a time base is established which corresponds to the difference frequency signal produced by the mixing of the transmitted and received Doppler signals with the transmitted frequency at the conventional value of 10,525 MHZ. For example, with the time increment counter having a count capacity of 25,600, the total time calculated by the product of the pulse spacing of 1.24456 microseconds times 25,600 is equal to approximately 31.8 milliseconds which would be equal to the time period that a counter could count 100 counts if each count represented 1 mile an hour corresponding to the frequency multiplication factor of 31.8 HZ of difference frequency per 1 mile per hour.

Stated another way, the time increment counter is so designed relative to the difference frequency (the received Doppler signal) that it will produce an output pulse in approximately 31.8 milliseconds. Since the frequency of received Doppler signals relative to a vehicle traveling 100 miles an hour is approximately 3,140 HZ for a transmitted frequency of 10,525 MHZ, the time period of same is equal to 318 microseconds. Accordingly, the time for the production of one pulse or the pulse spacing of a difference frequency at 100 miles per hour is equal to the 318 microsecond value. Therefore, in order to scale the time increment counter for 1 mile an hour increments, the 318 microsecond value is multiplied by 100 thereby enabling the use of a 31.8 millisecond time for pulse production in the time increment counter. As a result, each pulse (representing one cycle of the Doppler signal) counted in the time period scaled by the time increment counter will be equal to 1 mile an hour so that the vehicle speed is represented by the total number of pulses (or counts) received within the above-mentioned time period (31.8 milliseconds).

The time increment counter 12 is designed to produce four sequential output pulses at various time periods relative to the completion and/or start of a timing cycle. (For purposes of this disclosure, it may assume that the end of the timing cycle (or time period of 31.8 milliseconds) occurs simultaneously with the beginning of the next timing cycle.) These four pulses are shown in FIG. 3 relative to a time period called $T_0$ which is both the beginning and the end of a timing cycle. The four pulses, P1, P2, P3 and P4 are shown in FIG. 1 as coming out of the lower portion of time increment counter 12. It should be pointed out that the four sequential pulses P1-P4 may be produced by suitable means as long as they occur at the end of the timing cycle. For example, the pulse P1 is a 40 microsecond pulse that is produced immediately prior to the end of the timing cycle $T_0$ or at approximately 31.8606 milliseconds from the start of the timing cycle. Pulse P2 is produced 15 microseconds after the leading edge of pulse P1 and has a duration of approximately 5 microseconds. Pulse P3 is produced approximately 5 microseconds after the end of P2 (the trailing edge of pulse P2) and is also a 5 microsecond pulse. Pulse P4 is produced 5 microseconds after the occurrence of the trailing edge of pulse P3 and likewise has a 5 microsecond duration which thereby produces a trailing edge that substantially coincides with the time $T_0$.

As suggested above, the time increment counter 12 acts as a divider so that the signal output from same may be utilizable in other portions of the circuit. For instance, since the time period of 31.8 milliseconds corresponds to a frequency of approximately 31.4 HZ, a divide by 16 circuit results in an approximate frequency of 2 HZ which is used for the flashing of lights during the alarm period which will be discussed at a later time. This divider (divide by 16) is shown in block diagram form in FIG. 2 and is generally indicated by the numeral 13. Also, an audio signal of 750 HZ is taken out of time increment counter 12 on the line indicated as audio and is ANDED through AND gate 14 and through audio amplifier 15 so that an audio interrupted warning tone emits from speaker 16 when a speed violation is detected by the radar unit.

I have found that Doppler return signals are generally noisy, subject to reflections, and dropped pulses are altogether very inaccurate. My invention includes the concept of comparing several received signals and their corresponding values prior to reading out a particular frequency and/or speed. In this manner, the readout is not subjected to roll or flicker in that noise and reflection difficulties are substantially eliminated.

Returning to FIG. 1, the microwave Doppler detector is generally indicated by the numeral 17 and may be of conventional design to receive the reflected Doppler signals. The received signal is transmitted from the Doppler detector via line 17a through amplifier 15a (see FIG. 2) and eventually to the audio amplifier 15 as described above. Also, the Doppler signal is delivered to the pulse generator 18 which is essentially a one-shot multivibrator through the amplifier circuit 18a. As shown, the output from the pulse generator 18 (the Doppler signal after same is shaped or squared) is delivered via line 18b to the digital decimal counter 19 which counts the cycles of the received Doppler signal in terms of unit counts from 0 to 199.

As mentioned above, the timing pulse P1 is produced near the end of the timing period prescribed by the time increment counter. The pulse P1 is applied to pulse generator 18 via lines 20a and 20b and provides an inhibit function which precludes the further counting of the output pulses of pulse generator by digital decimal counter 19. At pulse time P2, the binary latch 21 is set by P2 on the line 22a and, after a 2 microsecond delay in delay element 23, an enabling condition then exists on AND gate 24. However, the other input to AND gate 24 (from the output of pulse generator 18) has been temporarily inhibited so that the normal output from same will not reset time increment counter via the output line 24a.

At the end of pulse P1 (i.e., the end of the timing cycle or time $T_0$) the inhibit condition initiated by the leading edge of pulse P1 on pulse generator 18 is relieved. The decimal counter 19 is, however, still inhibited due to the output of the binary latch 21 on line 21a through the OR gate 25 to the inhibit terminal of counter 19. At this time it is seen that a pulse derived by the reception of the Doppler signal and shaped in pulse generator 18 goes to AND gate 24 where it is ANDED with the output from binary latch 21 and finally produces an output pulse which is delivered to the reset terminal of time increment counter 12 via line 24a thereby resetting same. Simultaneously the output pulse resets the binary latch, but due to the 2 microsecond delay in delay element 23, ANDING of the two functions in gate 24 is permitted along with the resetting of the time increment counter. Similarly, the inhibit produced via the output of binary latch 21 and line 21a is relieved from the inhibit terminal of the digital decimal counter 19 so that the next received Doppler pulse enamating from the generator 18 will be counted in the decimal counter 19 and, since this count has been synchronized with the count entering the time increment counter, the decimal counter and the time increment counter are synchronized with further incoming pulses.

But for the above-mentioned synchronizing and time correlating function, the decimal counter would be unable to consistently repeat identical counts on the same received Doppler signal. In other words, the decimal counter could possibly read a 46 count one time, a 47 count the next and a 46 for the third (for a speed of approximately 46 mph) if the synchronizing of the time increment counter with the digital counter is not completed. Thusly, many of the advantages of comparing received counts is forfeited unless the proper correlation is had between the two counters.

As will be seen in more detail later, a number of pulses received by the microwave Doppler detector 17, shaped in pulse generator 18 and counted in decimal counter 19 may have a tendency to vary when it approaches the previous or next consecutive number. For example, if the reading corresponding to the received Doppler signal were to be equal to 49 miles an hour and suddenly the speed increases until the actual speed is closer to 49.9 miles an hour, the digital decimal counter will still read 49. However, with the increasing rate being applied to the received Doppler signal, the decimal counter may want to read at least 50 during one count and during the next timing cycle read 49 so that the radar unit has reached an indecision point as to whether to read one number or another (the 49 or 50 counts corresponding to 49 or 50 miles per hour). In order to remove the "jitter" from the received signal, I have developed an electrical equivalent of a mechanical detent at the crossover point. This is accomplished by changing the time base assigned to the time increment counter a preselected number of microseconds after two (or any other conveniently selected number) of received Doppler signals which were considered as misses (received signals which did not correspond to the previous decimal count). As will be discussed in more detail later, the pulse output time for the time increment counter is changed by approximately 40 microseconds after the two misses thereby permitting a newly received Doppler signal to be compared with the stored count on the decimal counter and, with the additional 40 microseconds, if the two readings now coincide, the number will be read out. This permits the received frequency to be indicated as a constant value rather than jumping (on the indicator) between read outs of 49 and 50 miles an hour when the corresponding received signal fluctuates slightly between the two values.

As mentioned above, the pulses P1 and P2 perform certain functions relative to the storing and transferring of numbers. In this regard, the pulse P2 has performed the above-mentioned function of inhibiting preselected gates until the functions assigned to the pulse P1 have been completed. P2 has another function, in that it operates in conjunction with the comparator to initiate the comparison of the number in decimal counter 19 with a previous number (including 0). The comparison function is accomplished in part by use of digital comparator 26 which compares the count on the output of decimal counter 19 with the amount stored on the output terminal of storage register No. 1. Of course, if there had been no previous signal to facilitate the comparison, as when the unit was just turned on, the storage register No. 1 would have a 0 in same. This condition could not obviously correspond with a received signal corresponding to the speed of 50 miles per hour. The digital comparator 26 would then have an output which would correspond to a no comparison reading. This output is inverted into inverter 26a and delivered to the input of AND gate 27. The other input to AND gate 27 is the presence of pulse P2 which is delivered to same via line 17a. The output of AND gate 27 is then used to insert the newly detected count (via line 27b) into storage register No. 1 and is also used to reset an update counter 28 thereby precluding an immediate validation of the received signal. Likewise, the "no comparison" condition is delivered to both storage register No. 1 and to a noncoincidence counter 29 (via line 27c) for further processing of the associated gates.

Assuming that the numbers counted in digital counter 19 did not agree with the number in storage register No. 1, a strobing condition will exist. In other words, the number counted in decimal counter 19 will be removed therefrom and inserted in storage register No. 1. To be more specific, the decimal counter 19 and the storage registers are integrated circuits which utilize the concept of latch and initiating signal. For instance, if a pulse is delivered to the latch terminal, the number on the input side of the integrated circuit is transferred to the output terminal and will remain there with the initiating signal removed from the input terminal. The strobe signal associated with AND gate 27 is delivered via line 27b to the latch terminal of storage register No. 1. The strobe signal then takes the number appearing on the input terminal to storage register No. 1 and stores same on the output side of the register. Accordingly, once the latch terminal is strobed, the change on the input terminal will not effect the number transferred to its output terminal. Therefore, the ANDING of the no comparison signal with the pulse P2 has effectively resulted in the number previously counted by decimal counter 19 being transferred to storage register No. 1. The occurrence of pulse P3 resets decimal counter 19 to 0 ( see FIG. 1) and is likewise delivered to the update counter 28 via line 28a.

With the pulse P3 resetting the decimal counter to 0, the cycle is again ready to be repeated. This time, assuming that the number counted during the second cycle of operation, corresponded to the number previously counted. Accordingly, a comparison is indicated in digital comparator 26 and the output of same is inverted in inverter 26a so that it is not of a corresponding nature with the pulse P2 appearing on line 27a at the input of AND gate 27 and thusly AND gate 27 is inhibited. The update counter 28 will not be reset so that update counter 28 may now count the pulse P3 as a valid comparison. The completion of more cycles resulting in comparisons and counted pulses in comparison counter 28 eventually fill the counter (having a preselected capacity) so that an output is delivered therefrom after the counter capacity is reached.

Since the above function always occurs during the pulse P3 time period, the output from update counter 28 is then ANDED through AND gate 30 to the latch terminal or strobe terminal of storage register No. 2. Accordingly, the number appearing in storage register No. 1 is shifted from storage register No. 1 to storage register No. 2. Since the number appearing in storage register No. 1 has been validated by the comparison counter, the shifted number now appearing on the output terminal of storage register No. 2 is immediately displayed by the digital displayed Nixie tube 31.

Assuming that the update counter has been preset to give an output after five valid comparisons have been made, and assuming that four comparisons were made, however on the fifth timing cycle a noncomparison was indicated by a digital comparator 26. The resulting ANDING of the noncomparison indication through AND gate 27 will reset comparison counter 28 and necessitate the counting of five ( depending on the accuracy desired) comparisons before the counter frequency of the received Doppler signal will be displayed to indicate the speed of the dictated vehicle. Since each comparison cycle is performed within 31.8 milliseconds, four comparisons are made in about 0.15 seconds. I have found that a valid reading can generally be accomplished in less than 2/10 of a second and with all of the displayed speeds being correct and validated. With the five comparison scheme, random noise is insignificant as far as being able to cause the comparison scheme to produce an incorrect or invalid reading.

My radar is further implemented and refined by the use of the alarm circuitry in conjunction with the resetting of the digital counter. It was pointed out that the counting process continues with each time increment and regardless of whether the count is strobed out of the digital counter or not. Since the counted numbers are constantly being compared, the counting and comparison technique is utilized with speed violation switches 32. It is possible to manually set the violation switches to a particular number (speed in miles per hour) which would result in the sounding of an alarm. For instance, if it is desired to sound an alarm at 45 miles per hour so that in a 35 mile per hour zone, every speed over 45 mile an hour is detected, the speed violation switches are manually set to the 45 mile an hour figure mentioned above. These switches are actually used in conjunction with coincident gates so that the electrical signal produced by a particular number will be passed through that gate at the time that particular number is reached. Therefore, if the speed violation switches are set at 45 miles per hour, the signal corresponding to 45 miles per hour in the digital decimal counter 19 is transmitted via line 32a to speed violation switches 32 and from thence to the violation switch latch 33. This component operates to latch the particular signal produced therein during the time period of the pulse P2. The output of the violation switch latch 33 is delivered to AND gate 34 which receives a second input from the output of update counter 28 via line 28b. Therefore, with the comparison counter indicating a valid signal and speed violation switches output indicating a speed in excess of the preset value, the output from the AND gate will correspond to a violation. This output (from AND gate 34 on line 34a) is delivered to violation latch 35 and from thence to the input to AND gate 36. This violation latch input is ANDED with the low frequency interrupt signal from divider 13 and transmitted on the output line 36a to the digital display 31 thereby producing a flashing light condition thereon. Also, the output of violation latch 35 is delivered to AND gate 14 and ANDED with the audio and divider signals for producing an audible tone at speaker 16 (of the beep, beep, beep nature).

Also, when violation latch 35 sets, an output on line 35a through inverter 35b enters the inhibit terminal 35c on AND gate 30 and prevents the strobe from going into storage register No. 2. This functions to lock up the digital display 31 so that the violation speed is maintained thereon.

The radar is also provided with a means for removing the displayed signal from digital display 31 in the presence of a bad signal (one which does not have a comparison indication). The noncoincidence counter 29 which receives an input via line 27c from the AND gate 27 is used to count the number of misses ( noncoincident comparisons) so that when a preselected number of misses are received in counter 29, an inhibit signal is transmitted to digital display 31 via line 29a which will extinguish the source of illumination therein. Therefore, if a bad or noisy signal is received, the reader of the digital display is not being led to believe that the illuminated display is in fact an accurate reading when really there is no signal at all being displayed. The first time that the unit receives a new update signal or a new series coincidence, the lights or source of illumination is turned back on and the digital display is allowed to further indicate the speed corresponding to the received Doppler signal.

For practical purposes of avoiding the inadvertent light failure on the digital counter, the inhibit on the digital display illumination feature is overriden when the alarm comes on. Accordingly, the display may not be turned off due to the reception of a bad signal or the like when a violation is indicated. The binary toggling and the relationship to the non-coincident counter 29 is discussed infra, on page 26, lines 9–15. As will be seen, two consecutive "misses" results in the "toggling" of a J-K flip-flop to determine the reset state of the time base or time increment counter.

CIRCUIT DIAGRAM AND COMPONENTS

Turning now more particularly to the more detailed circuit diagram shown in FIGS. 4 through 8 and the layout plot FIG. 9, it will be noted therein that extensive use has been made of integrated circuits. Several complex function devices are used for comparing, counting, storage and decoding functions, with the internal configuration and operating parameters made in accordance with conventional manufacturer's data sheets. For example, two counters manufactured by the Signetics Corporation and identified by their numbers 8280 (decimal counter see counter 72 in FIG. 6) and 8281 (binary counter see counter 83 in FIG. 5) are extensively used. These two devices operate in a similar manner with the decimal counter having a binary coded decimal output (0–9), while the binary counter has a hexidecimal output (0–15). In both of the above-mentioned devices, a negative transition at the input terminal advances the count by one step. Other data inputs (generally consisting of four other input terminals) allows presetting to a desired count by application of the negative going strobe pulse to a strobe input terminal. The strobe input may be used to reset to 0 count if data inputs are grounded or held low during the strobe input. By cascading the counters and presetting by means of data inputs, any desired total count may be obtained. Disabling the respective count inputs from either device allows it to be used as a storage or latch. Voltage levels present at data inputs will be transferred to the output terminals during strobe and same will be held when the strobe is completed. Finally, the comparators discussed in more detail, infra, are similar to those manufactured by Signetics Corporation under their identification of 8242 and has a combinational logic array which compares binary inputs. These comparators compare two four-bit binary numbers and two or more such devices may have their outputs paralleled for numbers greater than four-bits.

Other conventional uses include the conventional dual J-K binary flip-flop using a master-slave principle which may also be used as a binary toggle and as a set-reset latch as well as in the J-K mode.

As suggested above with reference to the block diagram, it is necessary to establish an accurate and precise time base for utilization of the unique features of the method and apparatus. Accordingly, a crystal oscillator is utilized to deliver the basic timing pulse. As shown in FIG. 4, transistor 50 operates in conjunction with crystal 50a to produce a precise oscillatory output on its collector having a frequency of 1.607 MHZ. This continuously running oscillatory signal is first delivered to J-K flip-flop 51 which serves to shape the output of the crystal oscillator and to divide the basic frequency by two. The output of flip-flop 51 is a rectangular pulse having a precise interval between consecutive negative transitions. Counters 52, 53, 54 and 55 serve to count or divide the output from flip-flop 51 by counting the exact number of negative going transitions. The total count ranges from 0 when all outputs of the above-mentioned counters are low, to 25,599 when all outputs from the above-mentioned counters are high. Upon the occurrence of the 25,600ths pulse (or count) all outputs are again low. A reset line 56 (or common strobe line) is connected to each of the counters and will reset same to the 0 state or to a count of 64 if the data input terminal 53aa of counter 53 is high. In this regard, a high condition on the reset or strobe line 56 causes the counters to recycle continually.

Figure 5:
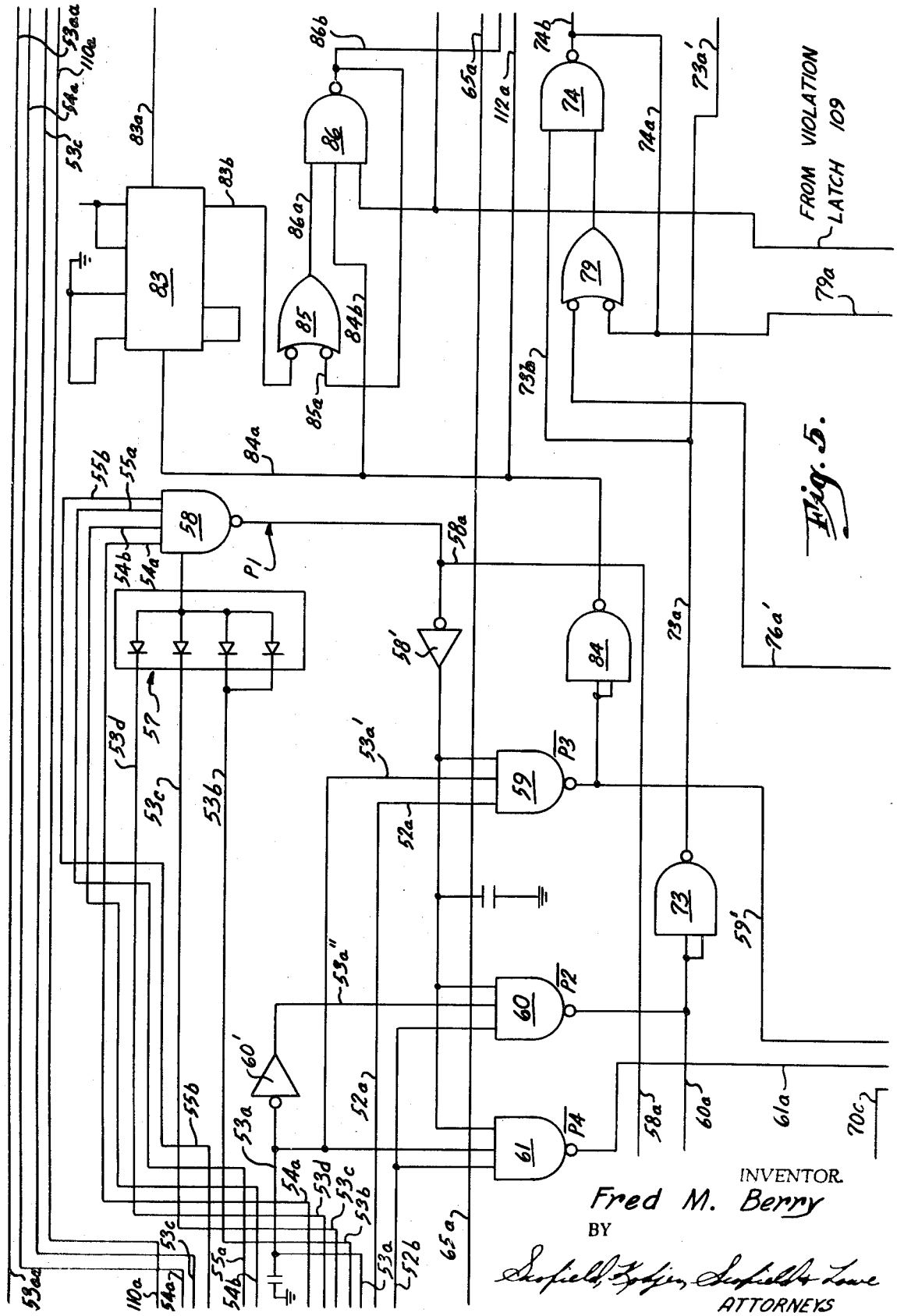
Figure 6:
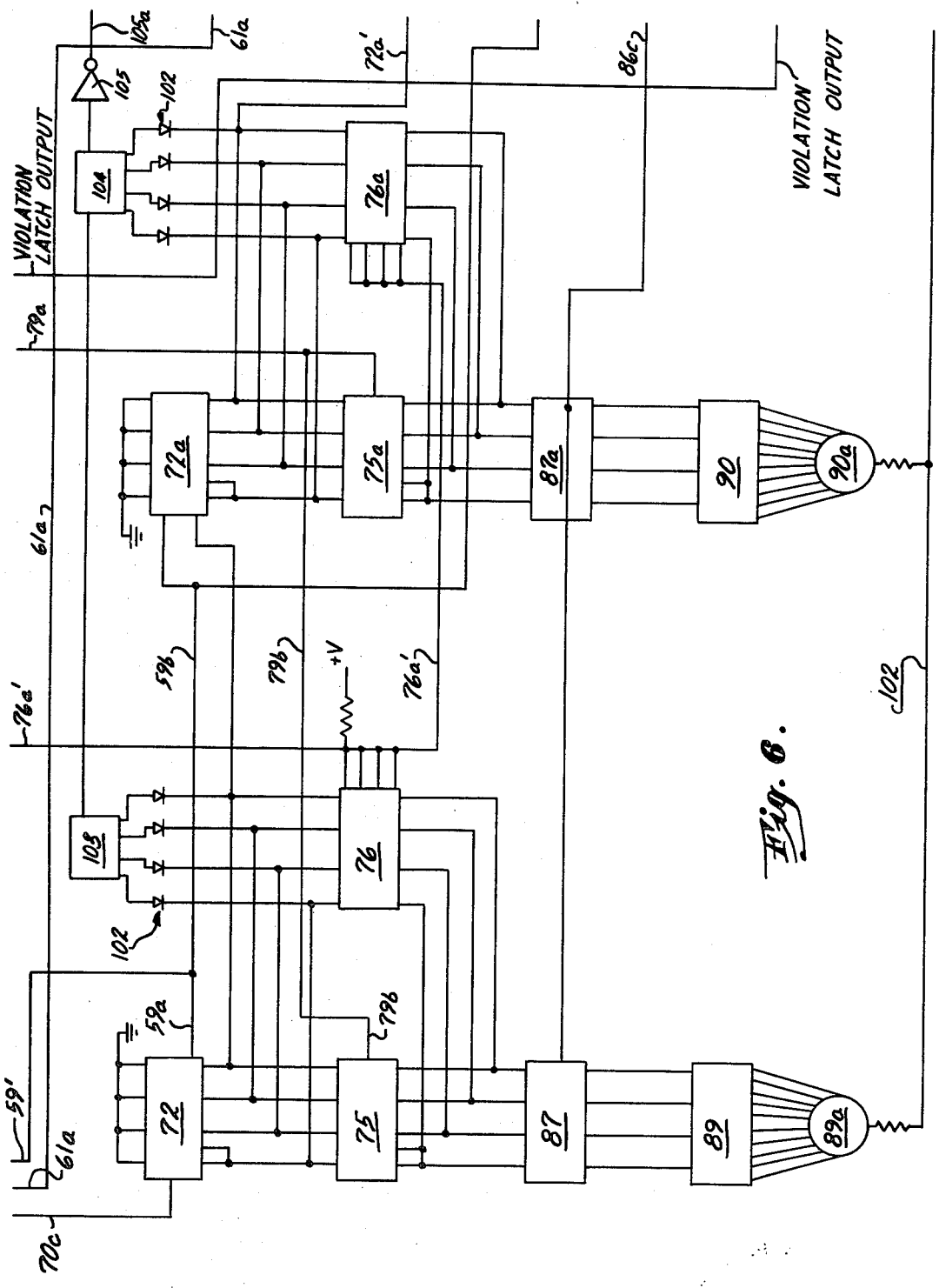

As previously suggested with reference to FIG. 3, the outputs of all stages of counters 52–55 are directed to a combination array of logic gates to provide output pulses at predetermined time intervals relative to the dividing of the oscillatory signal emanating from the crystal oscillator and binary flip-flop 51. Since these pulses are arranged to occur in sequence near the end of the total count and are used as clock pulses to direct sequential action of the system, the logic gates are appropriately connected to function in accordance with the required timing sequence. As shown in FIGS. 4 and 5, the outputs of counter 53 (53a through 53d), counter 54 (54a and 54b) and counter 55 (55a and 55b) are interconnected either directly to the input of gate 58 or through a diode expander generally designated by the numeral 57 and from thence (as with the case the output 53a through 53d) to the input of AND gate 58. The gate output corresponds to the pulse P1 shown in FIG. 3 as a positive going leading edge occurring some 40 microseconds before the end of the count $T_0$ and continuing to the end thereof.

A negative pulse indicated as $\overline{P2}$ of a 5 microsecond duration and starting 25 microseconds prior to the end of the count $T_0$ is produced at the output of AND gate 60. As shown in FIG. 5, the three inputs to AND gate 60 include the output from counter 52 on line 52b and the output from counter 53 on line 53a'' (which passes through inverter 60') which are ANDED with the pulses P1 mentioned above after same has passed through inverter 58'. In a similar manner, a 5 microsecond pulse $\overline{P3}$ is produced by AND gate 59, same having input terminals from the pulse P1 inverter line, output line 52a and 53a'. This pulse is delayed in time by 5 microseconds from the trailing edge of the pulse $\overline{P2}$. Finally, the pulse $\overline{P4}$ appears on the output of AND gate 61, same having inputs from the pulse P1 inverter 58', counter output line 52b and counter line 53a so that pulse $\overline{P4}$ appears 5 microseconds from the trailing edge of pulse $\overline{P3}$. The trailing edge of pulse $\overline{P4}$ occurs at the final count which is a transition of the counter back to its 0 state.

The time interval between the negative going transition at the input of the counter which causes the counter to change from full count to 0 count, to the negative transition causing the output of AND gate 58 to go low, is the precise time interval of 100 Doppler pulses from a vehicle moving at a rage of 100 miles per hour. The remaining 40 microseconds of time interval is used for gating of other system requirements.

DOPPLER SIGNAL CIRCUITS

The distance at which a vehicle will first activate the associated digital readout is adjusted by a front panel range potentiometer generally indicated by the numeral 62 (see FIG. 4). The input terminal receives the Doppler signal and passes same through potentiometer 62 and through an associated switch 62a to amplifier 63 which amplifies the low level signal and also limits the level of strong signals to permit proper operation of a Schmitt trigger circuit generally comprising transistors 64 and 65. These transistors (64 and 65) provide regenerative action and produce a square wave form output with rapid transitions at each 0 crossing of the Doppler signal.

The two gates interconnected with the collector output from transistor 65 (gates 66 and 67) form the square wave on the collector terminal into a 2 microsecond negative going pulse with one pulse occurring for each Doppler cycle. The inverter 68 inverts the 2 microsecond pulse and then directs same to the input of J-K flip-flop 69, and to AND gates 70 and 71.

Referring more particularly to the J-K flip-flop 69 and considering that same is in the reset state, its output on the terminal 69a will be high with output terminal 69b being low. The incoming Doppler pulse will, as a result, be directed through AND gate 71. This ANDING results in conditioning the reset (or strobe) line 56 so that the 2 microsecond pulse sets the respective counters (52–55) to their initial count (either 0 or 64). Since the J input of J-K flip-flop 69 is high (at a plus 5 volts), the trailing edge of the Doppler pulse results in the output at 69b going high. Therefore, the succeeding incoming Doppler pulses will then be directed through AND gate 70 with the associated production of positive pulses at the input to counter 72 via lines 70a, inverter 70b and line 70c. In the counter scheme, counters 72 and 72a form a BCD counter with a count capacity of 99 and with an overflow to counter 72b via line 72a' for a total count capacity of 199.

It should be pointed out that the circuitry described immediately above correlates the received Doppler signals with the time increment counter. As indicated, the first Doppler pulse sets the counters 52–54 and synchronizes the negative going transitions with the beginning of the count cycle $T_0$.

Since a starting sequence begins with a first Doppler pulse resetting the above-mentioned counters to 0 and with the trailing edge of the initial Doppler pulse permitting the counter to start its time interval, succeeding Doppler pulses are allowed to accumulate in counter 72, 72a, and 72b. When the time increment counter reaches the end of the timing cycle, the output of the gate 58 (which produces pulse P1) goes low and inhibits further accumulation of counts (in the BCD counter by inhibiting gate 67 on terminal 58a) until the start of the next timing cycle. After 15 microseconds, the clock pulse $\overline{P2}$ from gate 60 resets J-K flip-flop 69 via line 60a in readiness for the next cycle. Also, pulse $\overline{P2}$ is inverted by inverter 73 and delivered via lines 72a and 73b to the input of gate 74 for purposes to be discussed later.

As suggested above with respect to FIG. 2, the output states of counters 72 and 72a (see FIG. 6) are compared with the outputs of storage registers 75 and 75a. This comparison operation is performed by comparators 76 and 76a. If the above-mentioned outputs states do not match, the outputs of comparators 76 and 76a will remain at a low level and cause the gate 79 (see the combinational gates 74 and 79 in FIG. 5) to have a high level output. In this regard, the comparators 76 and 76a interconnect with gate 79 via line 76a'. The input to gate 74 will be high with the pulse P2 present at the input terminal on line 73b so that the output of same will go low and produce a negative going strobe pulse which latches registers 75 and 75a via the latching liens comprising lines 74a and 79a to register 75a and lines 74a, 79a and 79b to register 75. The states of counters 72 and 72a will then be transferred to the outputs of registers 75 and 75a.

If coincidence of all states had occurred, the outputs of comparators 76 and 76a would have gone high and the strobe pulse would not have been produced so that the output of the latches (registers) would have remained unchanged. The output strobe pulse (from gate 74) is also directed to reset the update counter 83 via lines 74b, 74c, or gate 80, inverter 81 and line 83a (FIGS. 5 and 7) and to the input of the miss counter 82 (FIG. 7) via the line 74b and 74d.

Five microseconds after the completion of pulse P2, pulse P3 is produced by gate 59 and delivered to counters 72 and 72a (FIG. 6) via lines 59', 59a and 59', 59b, respectively, thereby resetting the counters to 0. Pulse P3 is also directed to the input of update counter 83 via the inverter gate 84 and the associated line 84a so that the update counter is permitted to accumulate one count.

The data inputs of update counter 83 are connected to provide a preset count of 12. The output terminal connected with line 83b is high and goes low at the count of 0. Assuming a strobe P2 during pulse P2 time for the first timing cycle and the number stored in register 75 and 75a, at pulse P3 time of the same timing cycle, the count will change to 13 in update counter 83. If three succeeding timing cycles have equal Doppler counts, the strobe will not be generated and the output terminal at 83b of update counter 83 will go low, driving the output of gate 85 high, thereby conditioning the input terminal 86a of inverter gate 86. During the next (fifth timing cycle) pulse P3 will then be directed through gate 86 via lines 84a and 84b thereby producing an update pulse which results in the resetting of update counter 83 via lines 86b, OR gate 80, inverter 81 and line 83a so that update counter 83 will again require five consecutive identical Doppler counts (see FIGS. 5–7).

It should be pointed out that update counter 83 may be altered by changing the data inputs if other than five consecutive counts are desired. Also, the input to gate 85 at line 85a represents a holding circuit to permit a full width pulse at the output of gate 86, since during the reset, the input terminal on line 83b will go high.

The appearance of an update pulse (emanating from update counter 83) strobes the final registers 87 and 87a via lines 86b (FIG. 5) and 86c (FIGS. 6, 7 and 8) and transfers data from register 75 and 75a to the inputs of the decoder-drivers 89 and 90 respectively so that the Doppler count will be displayed in the respective Nixie tubes 89a and 90a. The J-K flip-flops 72b, 72c, and 72d extend the count capacity to 199 miles per hour and function as a counter and/or register latch. The decoder for the hundreds numeral 1 is provided by transistor 91 which is operatively connected with the Neon indicator tube 92.

Noncoincidences or "misses" of consecutive Doppler counts are counted by counters 82 and 82a (FIG. 7) and will extinguish the display if no updates are received within a limited time. Two consecutive "misses" also toggle J-K flip-flop 88 via line 88a. The output (on line 53a) of flip-flop 88 determines the reset state of the time base or time increment counter by the reset terminal connected to line 53a (see FIG. 4).

If a Doppler signal remains at a digital transition point, the count may change during five consecutive time cycles even with a pure signal. After two consecutive "misses," the time counter (flip-flop 51 and counters 52–55) is altered which will deflect the transition point and prevent "misses." The "miss" counters 82 and 82a are preset to the desired count by the data input connections. An update pulse occurring before the final count strobes the miss counters to their initial state. If an update pulse does not occur before reaching the final count, the output of miss counter 82a goes low and inhibits gates 93 and 94 (see FIG. 7) and removes the excitation of the power source for the display. The turning off of gates 93 and 94 is accomplished via the output of miss counter 82a going low and this low condition being transmitted to gates 93 and 94 by lines 95a, 94a and the common inhibit line 100c. This results in the inhibiting of gates 93 and 94 and removes the bias from transistor bases 101a and 101b so that the transformer action of transformer T is precluded and the power on the output line 102 (see FIGS. 7 and 8) is cut off to Neon tube 92 and Nixies 89a and 90a. Also, if an update is received after blanking or display extinguishing, the miss counters 82 and 82a will reset to their initial state and the display will be activated.

VIOLATION WARNING CIRCUITS

For the purpose of obtaining speed violation warnings, thumb wheel switches may be located on the front panel of the radar unit which may be manually set by the operator. If the speed indicated equals or exceeds the number set by the switches, an audio warning tone (of a beep, beep, beep nature) is activated and the digital display will flash on and off. In one mode of operation (manual), the display flashes off and on four times with the audio "beeps" accompanying the flashes and then resets to wait another timing cycle. In another mode (automatic), the display locks on the reading and will hold same until manually reset by a push button. Also, in the latter mode, the audio "beep" tone is disabled after four "beeps" with the display continuing to flash. To prevent possible unwanted violation indications such as a brief single update of a distant vehicle or a possible low flying aircraft, the warning circuits are arranged to require two successive updates both above the violation switch setting.

The output stages of binary counters 72 and 72a are connected through diodes generally indicated by the numeral 102 to the thumb wheel switches. For example, thumb wheel switch 103 will interconnect with the output of counter 72 while thumb wheel switch 104 interconnects with counter output 72a. As the count accumulates in the counters and the count number equals and exceeds the setting of the switches the output of inverter 105 goes low and sets the output of gate 106 high via line 105a. The OR gates 106 and 107 (FIG. 8) are connected to form an R-S latch. This latch will remain set during the timing period of the update pulse which occurs at pulse P3 time period and which will be reset by the occurrence of pulse P4 each timing via the line 61a.

If a violation has occurred and the R-S latch is set with the update pulse also present, the J input of the J-K flip-flop 97 goes high at the trailing edge of the update pulse, it will change state with the output on line 97a going high. The inverter gate 98 will then be activated on the next update pulse providing that R-S latch (gates 106 and 107) has again latched. If it has not latched on the second cycle, the update pulse is steered through inverter gate 108, OR gate 95, and inverter gate 96 to again reset the J-K flip-flop 97 to its original state. If two successive violations have occurred, the output of inverter gate 98 sets the violation latch 109 which includes the OR gates 99 and 99b.

When violation latch 109 is set, inverter gate 100 (FIG. 7) is turned on via line 99a so that it will gate the output of the counter 110 (see input on line 110a from FIG. 4) to the inputs of gates 93 and 94 via lines 100a and 100b, respectively. Counter 110 receives its input from the time counter (counters 51–55) and produces an output square wave having a time period of approximately 0.5 seconds. This produces the interruptions for the display and audio warning tone. Miss counters 82 and 82a are held reset to prevent blanking or the extinguishing of the display by the condition existing on line 94a, same being directed to the reset terminal of both the reset counters 82 and 82a (see FIGS. 7 and 8). The setting of the violation latch 109, causes a pulse to be transmitted via line 99a (FIG. 8) to inverter gate 100 (FIG. 7) thereby inhibiting the digital readout from changing once the violation has been detected as discussed above.

Figure 7:
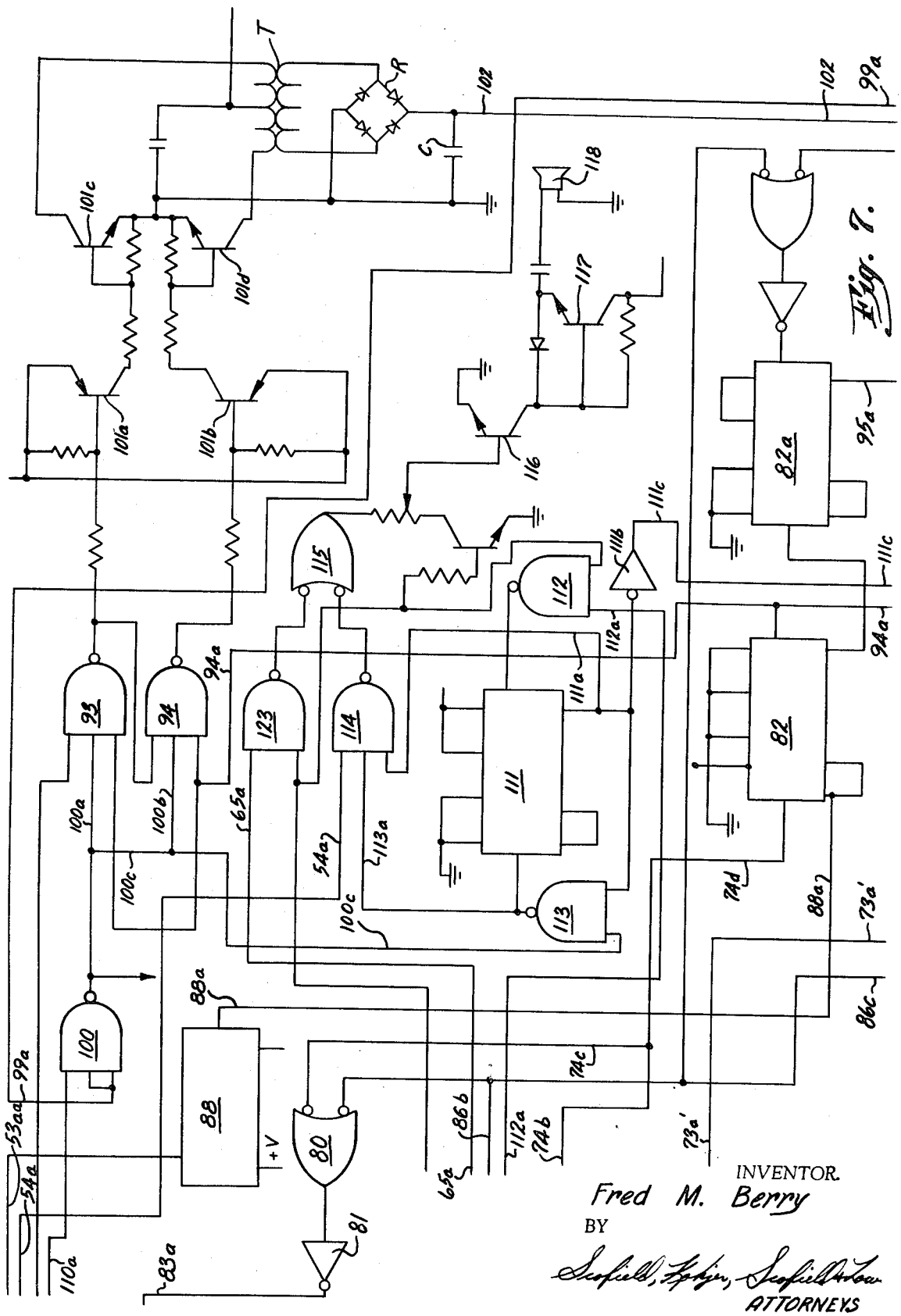
Figure 8:
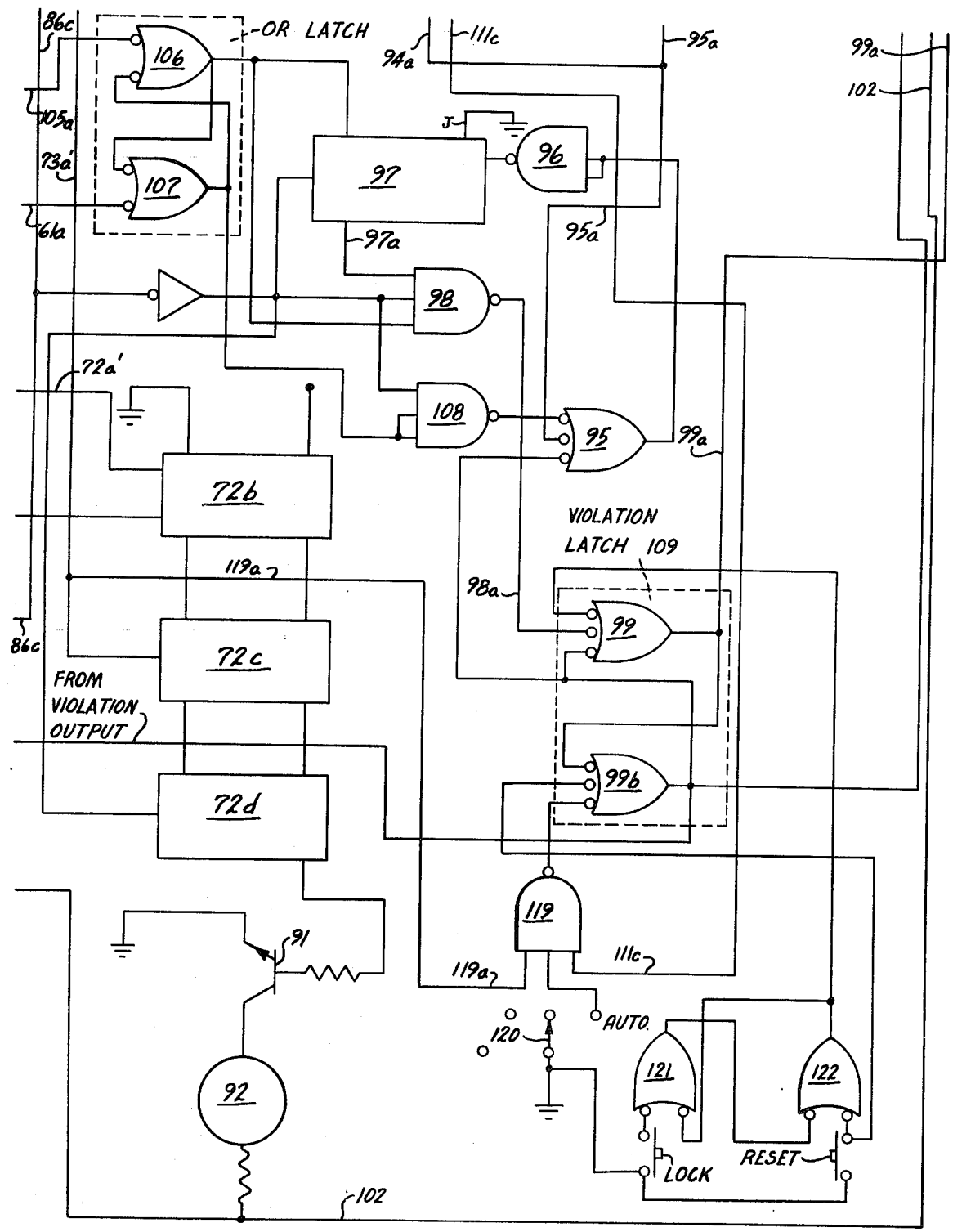

Counter 111 is designated as a "beep" counter and is normally reset each timing cycle by the pulse P3 through the inverter gate 112 via line 112a (see FIGS. 5 and 7 for the line 112a interconnecting the output of inverter gate 84 with the input terminal of inverter gate 112). When the violation latch 109 sets, gate 112 is inhibited and the counter is allowed to count the 0.5 second pulses now being gated through inverter gate 113 to the input of the "beep" counter 111 (gate 113 being interconnected with the inputs to gates 93 and 94 by the line 100c).

Gate 114 (FIG. 7) receives the above-mentioned gating pulse also emanating from inverter gate 113 on line 113a and additionally it receives the higher frequency audio pulses from the time generator counter 54 on line 54a (see FIGS. 4 and 7).

Gate 114 is also gated on by the output of counter 111 via line 111a until it has completed its count. An interrupted audio signal is produced at the output of gate 114 and OR gate 115 which is amplified by the transistor amplifier (including transistors 116 and 117) and delivered to speaker 118. When the "beep" counter 111 has been activated by a violation, it counts four 0.5 second pulses and terminates its count. Its output then goes low and inhibits gate 114 and terminates the audio beep. The "beep" counter 111 remains in this state, (being inhibited from further counts by gate 113) until reset.

In the manual mode, violation latch is reset by the output of the "beep" counter (when it has terminated its count) through inverter 111b ( and line 111c) to the input of gate 119. On the next timing cycle, the pulse P2 passes through gate 119 (FIG. 8) via lines 73a' ( see FIGS. 5, 7 and 8) and line 119a to the input of gate 119 resets the violation latch (output of 119). Another violation must occur before the "beep" counter 111 repeats its cycle.

In the automatic mode of operation, gate 119 is inhibited by the switch contact 120 being moved to the "Auto" terminal so that the violation latch 109 remains set until released manually. The OR gates 121 and 122 form a R-S latch ( which is set and reset by momentary contact LOCK and RESET push button switches, see FIG. 8). In the set or lock state, this latch independently sets the violation latch 109 and holds until released by the RESET push button.

The Doppler signal emanating from the collector of transistor 65 is gated through gate 123 (FIG. 7) via line 65a (see FIGS. 4, 5 and 7) and OR gate 115 to the volume control in the audio amplifier (transistors 116 and 117). It gives the operator an independent check on the quality of the received signal. During the violation alarm, gate 123 is inhibited and the volume control bypassed.

Power for the operation of the display is generated by square wave switching of the 12 volt source through the primary of the step-up transformer T. Drive for the switching transistors ( 101c and 101a) is obtained from a high frequency point on the time generator. The output of the transformer is bridge rectified by rectifier R and filtered by filter C to supply the 200 volts required for the display on line 102.

From the foregoing, it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A Doppler radar device for determining the speed of a moving object, said device comprising:
   means for producing a continuously running time base,
   means for receiving a Doppler signal,
   means for correlating said received Doppler signal with said time base,
   means for counting cycles of said correlated Doppler signal, said correlating means and said Doppler signal counting means cooperating to count said cycles of said Doppler signal in a preselected time increment, said time increment relating to said time base, and
   means for displaying the number of Doppler signal cycles in units indicative of the speed of said moving object.

2. The invention as in claim 1 including means for comparing a plurality of total counts of said Doppler signal prior to displaying a number as being indicative of the speed of said moving object.

3. The invention as in claim 2 including means for blanking said display means when a preselected number of counts did not compare.

4. The invention as in claim 3 including means for resetting said counting means to zero after each comparison.

5. The invention as in claim 2 wherein said comparing means includes means for requiring a preselected number of comparisons prior to said indicating of said count total as being a valid speed, said preselected number being sufficient to substantially eliminate noise and/or reflections as having an effect on said displayed speed.

6. The invention as in claim 1 wherein said correlating means includes a gate circuit interconnected with said time base and said receiving means, said gate circuit utilizing the first cycle of said Doppler signal to synchronize said received signal with said time base.

7. The invention as in claim 6 including means for establishing a time period corresponding to said time base, wherein said counting means includes a digital counter operable to count said cycles of said Doppler signal after said first cycle within said time period, said displaying means operable to display the number of counted Doppler signal cycles within said time period and to indicate same as the speed of said moving object.

8. The invention as in claim 7 including means for comparing a plurality of total counts of said Doppler signal prior to displaying a number as being indicative of the speed of said moving object.

9. The invention as in claim 7 wherein said comparing means includes a means for requiring a preselected number of comparisons prior to indicating said count total as valid, said preselected number being sufficient to substantially eliminate noise and/or reflections as having an effect on said displayed speed.

10. The invention as in claim 1 wherein said time base is established by an oscillator having a preselected precise frequency, a time increment counter, said correlating means including a gate circuit interconnected with said receiving means and said time increment counter, said gate circuit operable to synchronize the start of a time period counted by said time increment counter with said received Doppler signal, said time increment counter being operable to count said oscillator output cycles for the establishment of said timing period.

11. The invention as in claim 10 wherein said counting means includes a digital counter interconnected with said gate circuit and said time increment counter, said digital counter operable to count said synchronized Doppler signal cycles within said timing period.

12. The invention as in claim 11 including a storage register, a comparator circuit, said comparator circuit operable to compare the count in said digital counter with the count in said storage register, and means for requiring a preselected number of valid comparisons before said count in said storage register will be displayed in units indicative of the speed of said moving object.

13. The invention as in claim 12 including means for presetting a particular speed count, and means for giving an indication when said validated speed count is equal to or exceeds said preset speed count.

14. The invention as in claim 13 including means for precluding the change of said displayed speed after said indicating means has indicated a speed count equal to or in excess of said preset speed count.

15. The invention as in claim 12 including means for sounding a violation warning tone when said validated speed count is equal to or exceeds said preset speed count.

16. A Doppler radar device for determining the speed of a moving object, said device comprising
a time base,
means for receiving a Doppler signal,
a gate circuit interconnected with said time base and said receiving means, said gate circuit utilizing the first cycle of said Doppler signal to synchronize said received signal with said time base,
means for establishing a time period corresponding to said time base,
a counter, said counter operable to count the cycles of said Doppler signal after said first cycle within said time period, and
means for displaying the number of counted Doppler signal cycles within said time period in units indicative of the speed of said moving object.

17. The invention as in claim 16 including means for comparing a plurality of total counts of said Doppler signal prior to displaying a number as being indicative of the speed of said moving object.

18. The invention as in claim 17 wherein said comparing means includes a means for requiring a preselected number of comparisons prior to indicating said count total as valid, said preselected number being sufficient to substantially eliminate noise and/or reflections from having an effect on said displayed speed.

19. The invention as in claim 18 wherein said time base is derived from a continuously running oscillator having a precise frequency, and wherein said means for establishing a time period includes a time increment counter, said time increment counter starting said time period after said first cycle and ending said time period within a preselected time, said time increment counter having means associated therewith for producing a plurality of sequentially occurring pulses immediately prior to the end of said time period.

20. A Doppler radar device for determining the speed of a moving vehicle, said device comprising:
means for producing a continuously running time base said producing means including a precise high frequency reference signal having countable periods,
a counter connected with said reference signal and operable to count a preselected number of said periods, said counted periods thereby corresponding to a precise time increment for said time base,
means for receiving a Doppler signal,
means for correlating said received Doppler signal with said time base,
means for counting the cycles of said correlated Doppler signal, and
means for displaying the number of Doppler cycles in units indicative of the speed of said moving vehicle.

21. A method for determining the speed of a moving object, said method comprising the steps of
digitally producing a precise time base,
receiving a Doppler signal,
digitally correlating said received Doppler signal with said time base,
counting the cycles of said correlated Doppler signals, and
displaying the number of counted correlated cycles of said Doppler signals in terms of speed of said moving object.

22. The method as in claim 21 including the steps of establishing a timing period and performing said counting step within said timing period.

23. The method as in claim 22 including comparing a plurality of total counts of said Doppler signal received within said time period prior to displaying a number as being indicative of a valid speed of said moving object.

24. The method as in claim 23 including the step of requiring a preselected number of comparisons prior to indicating said count total as valid, said preselected number being sufficient to substantially eliminate noise as having an effect on said displayed speed.

25. The invention as in claim 24 including the steps of presetting a preselected speed count on a device, and indicating a validated speed count that is equal to or in excess of said preset speed count as a violation.

26. The invention as in claim 25 including the step of sounding an audible warning tone when said validated speed count exceeds said preset speed count.

27. The invention as in claim 25 including the step of precluding the changing of said validated displayed speed count that is equal to or in excess of said preset speed count.

28. The method as in claim 23 including the step of blanking said display means when a preselected number of counts did not compare during said comparison step.

29. The method as in claim 23 including the step of resetting said counting step to a zero count after each comparison step.

30. The method as in claim 23 including the step of changing said time period to correspond to counts at the transition.

* * * * *

UNITED STATES PATENT OFFICE
CERTIFICATE OF CORRECTION

Patent No. 3,689,921    Dated September 5, 1972

Inventor(s) Fred M. Berry

It is certified that error appears in the above-identified patent and that said Letters Patent are hereby corrected as shown below:

Please delete, for assignee, KUSTONA SIGNALS, INC. and substitute KUSTOM SIGNALS, INC.

Signed and sealed this 24th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,689,921        Dated September 5, 1972

Inventor(s) Fred M. Berry

It is certified that error appears in the above-identified patent and that said Letters Patent are hereby corrected as shown below:

Assignee shown as "Kustona Signal, Inc." should be --Kustom Signals, Inc.--.

Col. 1 --line 38 -- "product" should be --produce--.

Col. 1 --line 45 -- "receiver" should be --received--.

Col. 1 --line 53 -- "verses" should be --versus--.

Col. 2 --line 38 -- "agencys" should be --agencies--.

Col. 2 --line 46 -- after "tor" change (.) to --,-- and "Counting" should read -- counting --.

Col. 3 --line 6 -- "pluses" should be --pulses--.

Col. 3 --line 23 -- "as" should be --has--.

Col. 3 --line 67 and Col. 4, line 1 -- "it may assume" should be --it may be assumed--.

Col. 7 --line 5 -- "effect" should be --affect--.

Col. 7 --line 52 -- "dictated" should be --detected--.

Col. 8 --lines 7 & 8 -- "mile" should be --miles--.

Col. 10 --line 60 -- "rage" should be --rate--.

Col. 12 --line 6 -- "liens" should be --lines--.

Signed and sealed this 28th day of January 1975.

(SEAL)
Attest:

McCOY M. GIBSON JR.
Attesting Officer

C. MARSHALL DANN
Commissioner of Patents